March 29, 1955

L. C. PARODE ET AL 2,705,282

ELECTRONIC INTEGRATOR

Filed Dec. 9, 1952

INVENTOR.
GREGORY O. YOUNG,
BY LOWELL C. PARODE,

Nicholas T Volk

ATTORNEY.

United States Patent Office 2,705,282
Patented Mar. 29, 1955

2,705,282

ELECTRONIC INTEGRATOR

Lowell Carr Parode, Hermosa Beach, and Gregory O. Young, Hawthorne, Calif., assignors, by mesne assignments, to Hughes Aircraft Company, a corporation of Delaware Application December 9, 1952, Serial No. 324,871

7 Claims. (Cl. 250—27)

This invention relates to electronic integrating networks, and more particularly to pulse integrators suitable, for example, for controlling the operation of signal translating circuits.

In many circuit applications, changes in operating conditions must be detected instantly, and control signals or voltages must be developed which accurately represent these changes and which may be utilized to control various circuits in response thereto. For example, in UHF (ultra-high frequency) pulse transmit-receive systems, AFC (automatic frequency control) networks require reliable means for instantaneously detecting changes in the difference-frequency between the output wave of the local oscillator of the receiver and the signal pulses transmitted. Many other circuits, such as timing circuits used in computer networks and the like, require rapid and accurate detection of changes in their operating conditions.

The present invention discloses an improved electronic pulse integrating network which requires a minimum number of component parts which accurately and rapidly integrate signal pulses applied thereto to establish voltages indicative of the magnitudes and polarities of the signal pulses, and which provides a long time-constant memory between pulses, that is, it maintains voltages previously developed substantially constant between successive pulses. Signal pulses representative of operating conditions of a circuit may be applied to such integrating network to develop accurate control voltages that are representative of such changes. In accordance with the present invention, a high-impedance electronic discharge device adapted to receive signal pulses of varying polarity and magnitude, such as a pentode, has its electron discharge path serially connected through a resistor with the electron discharge path of a relatively low impedance tube, such as a cathode follower; this series circuit is adapted to be connected across the terminals of a direct-current voltage source. A bi-directionally conducting circuit which, for example, may be a pair of oppositely poled rectifiers or diodes, is connected across the terminals of the resistor, and an integrating capacitor is coupled to such bi-directionally conducting circuit.

When a negative signal pulse is applied to the pentode, the voltages at the terminals of the resistor increase in magnitude corresponding to the magnitude of the pulse, and the capacitor, which prior to the application of such negative pulse has a predetermined quiescent voltage applied thereacross, is charged linearly during the pulse to a positive voltage level above the aforementioned quiescent voltage which corresponds to the magnitude of the negative signal pulse. The integrating capacitor has a sufficiently small value of capacitance so that a relatively low impedance path established by the bi-directional conducting circuit provides a short time-constant network therewith, whereby the integrating capacitor may be accurately charged throughout the duration of a signal pulse of short duration in accordance with the amplitude and polarity of the pulse. Upon the occurrence of the trailing edge of the negative signal pulse, there is available at the cathode of the cathode follower a voltage which corresponds to the voltage change across the integrating capacitor. Output terminals coupled to such cathode circuit may be provided for utilizing the information which the voltage change on the capacitor constitutes. Also, upon the occurrence of the trailing edge of the negative signal pulse, substantially no leakage of the charge on the capacitor is permitted by virtue of the relatively high impedance paths through the nonconducting diodes and the grid-to-cathode impedance of the cathode follower. Consequently, such high impedance paths together with the integrating capacitor provide a long time-constant network and a resulting long voltage "memory" between pulses. Furthermore, the voltages at the terminals of the resistor will be maintained constant at the expiration of the negative signal pulse, whereby conduction of either diode, and further change in the voltage developed by the integrating capacitor during a succeeding signal pulse, will initiate from a new voltage level corresponding to the charge on the capacitor.

Had the above-mentioned signal pulse initially been a positive signal pulse, the operation of the circuit would be the same, except that the conduction through the bi-directional conducting circuit would be in a direction opposite to that described above, resulting in the discharge of the capacitor to a new voltage level lower than the quiescent voltage by the amount corresponding to the magnitude of the pulse.

It is, therefore, an object of this invention to provide an improved electronic pulse integrator which develops accurate, successive voltages indicative of both the magnitudes and polarities of successive signal pulses applied to said integrator.

It is another object of this invention to provide an improved electronic pulse integrating network for charging or discharging a capacitor linearly throughout the duration of a signal pulse applied to such network, depending upon whether such signal pulse is of negative or of positive polarity, to a new voltage level corresponding to the magnitude of the pulse, and which functions effectively to maintain the new voltage level substantially constant until the application of a succeeding signal pulse thereto.

It is still another object of this invention to provide a new and improved electronic integrating network requiring a minimum number of simple component parts and which functions rapidly during the application of successive signal pulses to said network to develop respective voltage changes corresponding to the magnitudes and polarities of such pulses and to maintain the voltages previously developed substantially constant between pulses.

The novel features which are believed to be characteristic of the invention, both as to its organization and method of operation, together with further objects and advantages thereof, will be better understood from the following description considered in connection with the accompanying drawings, and the scope of the invention is pointed out in the appended claims. In the drawings:

Figure 1:
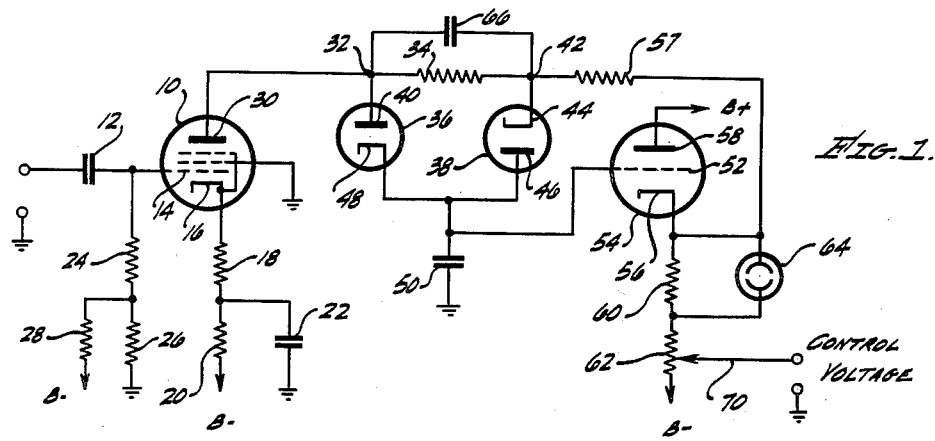
Fig. 1 is a schematic circuit diagram of an electronic pulse integrator in accordance with this invention.

Referring to Fig. 1, a high-impedance electron tube 10 which, for example, may be a pentode as shown, is adapted, as by means of capacitor 12, to have signal pulses applied to its control grid 14. In order to achieve efficient operation of pentode 10 for the application of signal pulses of both positive and negative polarities, pentode 10 should be biased so as to operate along the straight line portion and preferably at the center of its dynamic characteristic. To achieve this operating condition, there is connected between the cathode 16 and the negative terminal B− of a source of D. C. (direct-current) voltage a pair of serially-connected resistors 18, 20, to the junction of which a capacitive connection to a point of reference or ground potential is provided, as by means of capacitor 22, as shown. Also, the junction of a pair of serially-connected resistors 24, 26 connected between control grid 14 and ground is resistively connected, as by a resistor 28, to the negative terminal B−. Unbypassed cathode resistor 18, which provides cathode degeneration in a conventional manner for stabilizing the operation of pentode 10, effectively adds to the impedance of pentode 10. Capacitor 22 operates in a conventional manner to bypass RF (radio-frequency) currents which appear in the cathode circuit. By means of resistors 18, 20, 24, 26, and 28, the desired grid-cathode bias is obtained for effecting the desired operation of pentode 10 along the straight portion of its characteristic.

The anode 30 of pentode 10 is connected to one terminal 32 of a resistor 34 having a relatively low value of resistance. A pair of unidirectionally conducting devices, such as, for example, a pair of rectifiers or diodes 36, 38, is connected in a closed loop that includes resistor 34, with the anode or plate 40 of one diode 36 connected directly to terminal 32 of resistor 34, the opposite terminal 42 of resistor 34 being connected to the cathode 44 of diode 38, and the remaining anode 46 of diode 38 and cathode 48 of diode 36 being directly connected together.

An integrating capacitor 50 is connected between ground and the junction of anode 46 and cathode 48 of the respective diodes 38, 36. Also, a direct connection is provided between the junction of anode 46 and cathode 48 to the control grid 52 of a cathode follower electron discharge device 54. The cathode 56 of cathode follower 54 is resistively connected by means of resistor 57 to terminal 42 of resistor 34. A direct-current path provided between the positive terminal B+ and the negative terminal B− of the aforementioned D. C. voltage source includes the electron discharge path of cathode follower 54, which has its anode 58 connected to the positive terminal B+, and a pair of resistors 60 and 62 serially connected between cathode 56 and the negative terminal B−.

Resistor 60 functions to provide a starting voltage for a glow discharge device, such as a neon tube 64, which is a variable resistance element of a well-known type, connected thereacross. Hence, when the circuit is energized, sufficient voltage is developed across resistor 60 to fire neon tube 64. Thereafter, resistor 60, which provides a relatively large resistance compared to that of neon tube 64, is substantially eliminated or bypassed as an operative portion of the cathode circuit of cathode follower 54.

The arrangement of cathode follower 54, cathode resistors 60 and 62, neon tube 64, and the connection from integrating capacitor 50 to cathode follower control grid 52 is disclosed and described in a copending application of Gregory O. Young entitled "Electronic Integrator," Serial No. 324,872, filed on December 9, 1952, and assigned to the same assignee as is the present application.

From the foregoing description and an inspection of Fig. 1, it can be seen that direct-current paths are provided between the positive and negative terminals B+ and B− (a) through cathode follower 54, neon tube 64 and resistor 62, and (b) through cathode follower 54, resistors 57 and 34, pentode 10, and resistors 18, 20. Thus, as long as cathode follower 54 is conducting, terminal 42 of resistor 34 is positive with respect to terminal 32 thereof. In accordance with this invention, an initial steady state or direct-current flow through resistor 34 is maintained which provides a predetermined voltage at the center of resistor 34. Since diodes 36, 38 are substantially equal resistors, the voltage at the junction of anode 46 and cathode 48 of the respective diodes 36 and 38 is substantially the same as the voltage at the center of resistor 34. Thus, an initial quiescent or steady state voltage across integrating capacitor 50 is established which is equal to the voltage at the center of resistor 34. Furthermore, the potentials available at terminals 42 and 32, relative to the quiescent voltage at the center of resistor 34, are of magnitudes sufficient to provide hold-off bias voltages for the respective diodes 38 and 36, that is, to provide bias voltages which, in the absence of signal pulses applied to grid 14 of pentode 10, will prevent conduction of either diode. A capacitor 66 shunting resistor 34 functions in a well-known manner to aid in maintaining the desired D. C. bias for the diodes 36, 38 during the occurrence of a pulse. Capacitor 66 also provides a low-impedance path to terminal 42 for negative voltage pulses appearing at terminal 32 of resistor 34, thereby to insure that such voltage pulses appear at terminal 42 substantially unattenuated.

Resistor 57 is employed to provide a voltage drop between cathode 56 of cathode follower 54 and terminal 42 of resistor 34, thereby to apply at terminals 42 and 32 the necessary hold-off voltages for respective diodes 38 and 36. For example, if the aforementioned quiescent voltage, that is, the voltage at the center of resistor 34, is zero with respect to ground and the necessary hold-off bias voltages for respective diodes 38 and 36 are +1 volt and −1 volt with respect thereto, then for a potential of, for example, six volts positive at cathode 56 of cathode follower voltage 54, resistor 57 will provide a voltage drop of 5 volts in order to obtain the necessary hold-off bias voltages.

Figure 2:
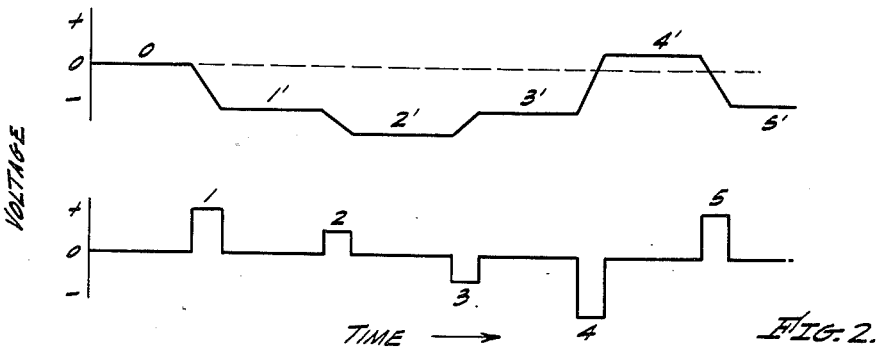
Fig. 2 shows waveforms illustrating the action of the integrator of Fig. 1 in response to signal pulses of varying magnitude and polarity.

The operation of the above-described circuit will now be explained with reference to Fig. 1 and also to Fig. 2, which illustrates variations in operating voltage levels across the integrating capacitor 50 with variations in magnitude and polarity of signal pulses applied to the control grid 14 of pentode 10.

Assume that initially a positive signal pulse 1 (Fig. 2) is applied to control grid 14 of pentode 10. By virtue of the conventional operation of an electron tube, the anode voltage of pentode 10 will decrease. Because of the high impedance of the pentode 10 to current flow therethrough, the voltage at terminal 32 of resistor 34 will decrease substantially linearly throughout the duration of the positive signal pulse 1 applied to control grid 14; accordingly, the potential at the terminal 42 of resistor 34 will correspondingly decrease, as will the voltage at the center of resistor 34. With the negative hold-off bias for diode 36 becoming more negative, diode 36 will be maintained in the nonconducting state; however, with the relatively positive hold-off bias for diode 38 being less positive, diode 38 will be rendered conducting for the duration of the applied signal pulse 1, and integrating capacitor 50 will be discharged linearly by an amount corresponding to the change in potential at the center of resistor 34, that is, the low resistance of conducting diode 38 and capacitor 50 provide a sufficiently short time constant for accurately discharging capacitor 50. For example, if the initial voltages at terminal 32, the middle of resistor 34 and terminal 42 are respectively −1, 0, and +1 volts and the applied signal pulse 1 effects a decrease of the voltage at terminal 32 by 1 volt, then the respective voltages at terminal 32, the middle of resistor 34, and terminal 42 will decrease to −2, −1, and 0 volts; since the integrating capacitor 50 discharges linearly from an initial quiescent voltage equal to the initial voltage at the center of resistor 34, then the potential across the integrating capacitor 50 at the end of signal pulse 1 will be −1 volt. Referring to Fig. 2, if the integrating capacitor 50 was initially operating at a zero voltage level, it will be discharged to a lower voltage level 1′ differing from the initial zero voltage level in accordance with the magnitude of signal pulse 1.

At the occurrence of the trailing edge of signal pulse 1, both diodes 36 and 38 are again nonconducting. However, the hold-off bias voltages for diodes 36 and 38 will not return to the initial values above mentioned; because of conventional cathode follower action, the potential at cathode 56 of cathode follower 54 falls correspondingly with the operating voltage level of integrating capacitor 50. Furthermore, the steady state condition of cathode follower 54 will have decreased at the occurrence of the trailing edge of signal pulse 1. Hence, by virtue of the fixed voltage drop obtained across resistor 57, the potential at terminal 42 of resistor 34 will be maintained constant at the level existing at terminal 42 at the expiration of signal pulse 1. For example, consider the situation, previously mentioned, for an initial potential of 6 volts on cathode 56, for which a voltage drop of 5 volts across resistor 57 provided an initial hold-off voltage for diode 38 of +1 volt at terminal 42 and −1 volt for diode 36 at terminal 32. A decrease of one volt from the quiescent voltage of integrating capacitor 50 is accompanied by a fall in the potential at cathode 56 of cathode follower 54 to 5 volts. Since resistor 57 provides a 5 volt drop, the new potential at terminal 42 at the expiration of signal pulse 1, will be 0 volts, that at the center of resistor 34 will be −1 volt, and that at terminal 32 of resistor 34 will be −2 volts.

Since the potential at the cathode 56 of the cathode follower 54 decreases in response to the negative charge established across integrating capacitor 50 in the manner above described, neon tube 64 functions in a conventional manner to permit this voltage change to appear at the junction of resistors 60 and 62 substantially unattenuated. Thus, a control or output voltage lead 70 connected to resistor 62 may be provided for obtaining voltages therefrom which vary with the charge on integrating capacitor 50.

Coincidentally with the trailing edge of signal pulse 1, the high impedance presented by the nonconducting diodes 36, 38 and the grid-cathode impedance of cathode follower 54 substantially eliminate possible leakage paths for the charge established on capacitor 50 and effectively establishes a long time-constant network therewith. Therefore, the voltage change established across integrating capacitor 50 is maintained substantially constant for a relatively long period of time, as are the changes in potential at terminals 32, 42 of resistor 34, until the application of a succeeding signal pulse 2 applied to control grid 14 of pentode 10. For example, the voltage change previously achieved may be maintained substantially constant for approximately 100 microseconds. Furthermore, integration by or the linear charging of integrating capacitor 50 is extremely rapid; for example, accurate integration is obtained for signal pulses of as low as 5 microseconds duration.

For a succeeding signal pulse 2 applied to pentode 10, which has also the same polarity as the preceding signal pulse 1 but which is of lesser magnitude, the aforementioned operation of the circuit is the same, except that the hold-off biases for diodes 36 and 38, and the previous operating voltage 1' of integrating capacitor 50 will be further lowered, in accordance with the magnitude of signal pulse 2, to a new voltage level 2'.

For a signal pulse 3 of negative polarity applied to control grid 14 of pentode 10 following the expiration of signal pulse 2, the hold-off bias voltages for diodes 36 and 38 will be raised linearly in the same manner as such voltages were lowered during the application of positive signal pulses 1 and 2. Hence, diode 36 will be rendered conducting while diode 38 is non-conducting, thus allowing integrating capacitor 50 to be charged to a new voltage level 3' corresponding to the increase in the voltage level provided at the center of resistor 34. Similarly, successive signal pulses 4 and 5 (Fig. 2) applied to pentode 10 in the aforementioned manner, and which are negative and positive, respectively, will effect further respective increases and decreases of the voltages at terminals 32 and 42 of resistor 34 and in the operating voltage level of the integrating capacitor 50, of respective higher and lower voltage levels 4' and 5'.

It will be observed that the above-described procedure for charging and discharging integrating capacitor 50 is in contrast to prior art integrating circuits which effect, during the occurrence of a pulse, the charging or discharging of an integrating capacitor, always from a fixed reference voltage level, and the discharging or charging of such capacitor back to the fixed reference voltage level upon occurrence of the trailing edge of the pulse. In such prior art circuits, of course, individual tubes employed are supplied with a fixed operating bias, inasmuch as the potential built up across the integrating capacitor is returned to a fixed reference level between pulses. However, as is well known, considerable demands are placed upon circuits employed for obtaining rapid integration during the application of signal pulses thereto, and accurate integration is difficult to obtain, particularly for high pulse repetition rates.

It should be pointed out that diodes having cutoff points requiring equal and opposite hold-off bias voltages should be chosen for use in the circuit of Fig. 1. Furthermore, it is important that such diodes be of the non-leakage type, in order to insure the maximum possible time constant or memory characteristic for an integrator network of the type above described.

While it will be understood that the circuit specifications of the pulse integrator of this invention may vary according to the design for any particular application, the following circuit specifications for a pulse integrator are included, by way of example only, as suitable for an integrator adapted to integrate rapidly during the application thereto of pulses of five microseconds duration, and to maintain voltage changes developed during such pulses for as long as 100 microseconds:

Resistor 34_____ 560 ohms.
Capacitor 66_____ 0.1 microfarad.
Integrating capacitor 50_____ 2200 micromicrofarads.
Resistor 62_____ 15,000 ohms.
Resistor 57_____ 510 ohms.

Figure 3:
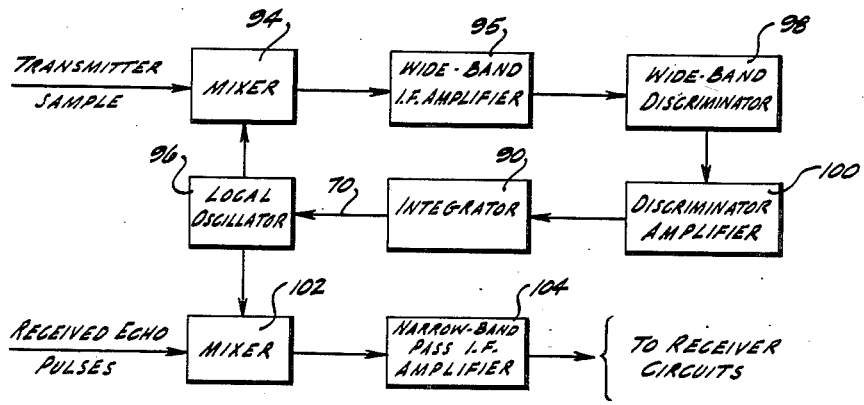
Fig. 3 is a block diagram of an ultra-high-frequency automatic frequency control system illustrating, by way of example, one use of the integrator of Fig. 1.

A practical application of an electronic integrator of the type above described is shown, by way of example, in Fig. 3. Referring to Fig. 3, an electronic pulse integrator 90 of the type above described is employed in a difference-frequency AFC circuit or loop of a UHF frequency pulse transmit-receive system of the type previously mentioned, wherein echoes of transmitted signal pulses are applied to suitable receiving circuits for determining the location of an object. Such an AFC loop, for use where the transmitter and receiver are at the same location, and in which the transmitter frequency is compared with the local oscillator frequency, is described and claimed in a copending application of Gregory O. Young entitled "Automatic Frequency Control," Serial No. 324,873, filed December 9, 1952, now abandoned, and assigned to the same assignee as is the present application.

Transmitter sample pulses are applied to a mixer 94 along with a portion of the output of a local oscillator 96 which may consist of a klystron. Wide-band IF (intermediate-frequency) amplifier 95 is coupled to mixer 94 for amplifying signals whose frequency may deviate considerably from the center frequency thereof.

A discriminator 98 coupled to IF amplifier 95, and which preferably operates over a band as wide as the pass band of IF amplifier 95, is employed to develop signal pulses whose amplitude and polarity correspond to the deviation, from the center frequency of IF amplifier 95, of the frequency of signals from mixer 94, and which are amplified by a discriminator amplifier 100 to provide the desired gain. The integrator 90 is adapted to receive the signal pulses from amplifier 100, which may be coupled to pentode 10 (Fig. 1).

When the frequency of the signals developed by mixer 94 deviates from the desired center or intermediate frequency, the integrator 90 operates in the manner previously described to develop a control voltage which varies from pulse to pulse and provides accurate information in accordance with the output of discriminator 98. Such control voltage may be applied, as by control or output lead 70 (Fig. 1) to the local oscillator 96 in a conventional manner for changing the frequency of operation thereof as necessary to maintain the output of mixer 94 at the desired center or intermediate frequency. Consequently, output signals from receiver mixer 102, which mixes the output wave from local oscillator 96 with received echo signals, will be maintained at the desired center or intermediate frequency, thus permitting the use of a relatively narrow pass band, high gain IF amplifier 104 for operating receiving circuits coupled thereto.

In a typical UHF AFC loop employing an integrator of the type herein described, precise control voltages have been provided for eight megacycle step changes in difference-frequency between successive five-microsecond transmitted pulses. The control voltages have been maintained with substantially negligible error, after each pulse, for over 100 microseconds until the echo signal was received. Such accuracy was found sufficient to permit the use of a receiver IF amplifier having a bandwidth of only 120 kilocycles.

A discriminator (such as discriminator 98) of the type above mentioned, which is capable of operation over a 20 megacycle range, is described and claimed in a copending application of Gregory O. Young et al. entitled "Frequency Discriminator," Serial No. 324,874, filed December 9, 1952, and assigned to the same assignee as is the present application.

What is claimed is:

1. An electronic pulse integrator comprising, in combination, a direct-current path including a first electron tube, impedance means, and a second electron tube serially connected and adapted for connection to the terminals of a direct-current voltage source, means for applying successive signal pulses of varying magnitude and polarity to said first tube, bi-directional conducting means shunt-connected with said impedance means and adapted to be rendered conducting only upon signal pulses being applied to said first tube, integrating means coupled to said bi-directional conducting means, said bi-directional conducting means being operative upon the application of negative and positive signal pulses to said first tube to effect the development by said integrating means of positive and negative voltages corresponding in magnitude to respective negative and positive signal pulses, said integrating means being coupled to said second tube, and said second tube and said bi-directional conducting means at the trailing edge of a signal pulse being operative to maintain substantially constant between pulses the voltage developed by said integrating means during each pulse.

2. An electronic pulse integrator comprising, in combination, a direct-current path including a resistor, bi-directional conducting means connected across the terminals of said resistor and poled to be normally nonconducting, integrating means coupled to said bi-directional conducting means and having a predetermined quiescent voltage, said direct-current path also including a first electron discharge device for receiving signal pulses of varying magnitude and polarity, said bi-directional conducting means upon application of negative and positive signal pulses to said first electron discharge device being rendered conducting for effecting development by said integrating means of voltages differing from said quiescent voltage by amounts corresponding to the magnitudes of said signal pulses, and said direct-current path further including a second electron discharge device coupled to said integrating means and operable with said bi-directional conducting means at the expiration of each signal pulse to maintain substantially constant between pulses the voltage developed by said integrating means during each pulse.

3. An electronic pulse integrator comprising, in combination, a relatively high impedance electron discharge device for receiving signal pulses of varying polarity and magnitude, a relatively low impedance electron discharge device, a source of direct-current voltage, said devices having their electron discharge paths connected serially across said voltage source, impedance means included in said serially-connected electron discharge paths, bi-directional conducting means connected in parallel with said impedance means and poled to be biased against conduction by voltages developed at the opposite ends of said impedance means in the absence of signal pulses applied to said high impedance device, an integrating capacitor connected between said bi-directional conducting means and a point of reference potential, said bi-directional conducting means being conductive in a direction depending upon the voltages at the opposite ends of said impedance means being raised and lowered, respectively, by amounts representative of the magnitudes of negative and positive signal pulses received by said high impedance device to charge and discharge said capacitor linearly by amounts corresponding to the magnitudes of said negative and positive signal pulses, and said relatively low impedance device having a grid circuit coupled to said capacitor and a cathode circuit for developing voltages representative of the charge on said capacitor and for maintaining at the expiration of a pulse the change in voltages at the ends of said impedance device, and the grid-cathode circuits and said bi-directional conducting device at the expiration of each pulse being operative to substantially prevent leakage of the charge on said capacitor.

4. The pulse integrator defined in claim 3, in which said high impedance electron discharge device is a pentode having a control grid for receiving signal pulses, a cathode coupled to the negative terminal of said voltage source, and an anode connected to one end of said impedance means.

5. The pulse integrator defined in claim 3, in which said impedance means comprises a resistor, and in which said bi-directionally conducting means includes a pair of oppositely poled, unidirectionally conducting devices.

6. The pulse integrator defined in claim 5, in which said unidirectionally conducting devices are rectifiers, each having an anode and a cathode, the anode of one rectifier being connected to one end of said resistor and the cathode of the other rectifier being connected to the other end of said resistor, and the remaining anode and cathode of said rectifiers being directly connected to each other.

7. The pulse integrator defined in claim 6, in which the relatively low impedance electron discharge device comprises a cathode follower having at least an anode, cathode and control grid, said anode of said cathode follower being connected to the positive terminal of said voltage source, the junction of said remaining anode and cathode of said rectifiers being connected to said control grid, and said cathode of said cathode follower being coupled to one end of said resistor, and a further resistor coupled between said cathode of said cathode follower and the negative terminal of said voltage source.

No references cited.